Patented Aug. 7, 1951

2,563,499

UNITED STATES PATENT OFFICE 2,563,499

PROTECTIVE COATING FOR SPRAY BOOTHS

Chester W. Smith, Detroit, Mich., assignor to Detrex Corporation, Detroit, Mich., a corporation of Michigan No Drawing. Application April 29, 1947, Serial No. 744,767

1 Claim. (Cl. 106—2)

This invention relates to compositions useful in the protection of the interior surfaces of spray booths and the like, and to a process for protecting and cleaning the inner surfaces of such spray booths by applying a composition adapted to dry to a coating substantially impervious to the action of cold water but removable by the use of warm or hot water. The composition of the invention may also be used in forming protective coatings on various other surfaces where the protective coating must be resistant to the action of cold water but easily removable with warm water.

In the operation of spray booths it is desirable to protect the inner surfaces thereof from the direct action of the material being sprayed. Such inner surfaces are normally constructed of a sheet metal such as galvanized steel which in the course of time takes on a coating of the paint or other material being sprayed which coating accumulates and in this form is removable only with great difficulty. Moreover, such accumulations present undesirable fire hazards and a general lowering of the reflected light level within the spray booth. Various coating compositions have been proposed for the protection of such surfaces but these have either required extensive scraping in their removal or, where removable by water, have been subject to the disadvantage that they were affected by cold water and therefore lacked protection against the action of the cold water normally splashed from the water curtain or sprays during the operations carried out in the spray booth. Moreover, the coatings heretofore proposed have either been colored, light absorbing or non-reflectant and have therefore not contributed to the reflection of light within such spray booths.

One object of the present invention is to provide a protective coating composition which will avoid the disadvantages of the prior art compositions through a resistance to the action of cold water combined with characteristics which make possible its removal by the action of warm or hot water.

A further object of the present invention is to provide a protective coating composition for spray booths which will present a white, light reflectant surface impervious to the action of cold water or other substances normally present in spray booth operations.

A still further object of the present invention is to provide a process for removing material deposited on the interior surfaces of spray booths and the like during their normal operation.

The composition of the present invention is prepared by forming a suspension in water of a suitable pigment such as talc, whiting or chalk together with colloidal clay. To this suspension there is added an emulsion of soft wax in water. The combination of the pigment such as talc, whiting or chalk together with colloidal clay and wax emulsion gives a coating substantially impervious to cold water, and the pigment gives a finished coating which is light reflectant. The final composition has about the consistency of paint and contains about 30% to 35% pigment solids, about 2% clay solids and about 5% wax solids. In forming the soft wax emulsion an emulsifier such as a polyether sorbitan monopalmitate mixture may be used or other emulsifiers such as triethanolamine oleate and the like may be used. Suitable amounts of the ingredients referred to above are set forth in the following preferred examples:

Example 1

Pigment suspension:
Whiting _____ grams__ 27.4
Colloidal clay _____ do____ 2.25
Water _____ cc____ 54.33

Wax emulsion.
Paraffin wax _____ grams__ 6.4
Mixed polyether sorbiton mono-
 palmitate _____ do____ 1.12
Water _____ cc____ 8.5

The wax emulsion is stirred into the pigment suspension in an amount corresponding to one part by volume of wax emulsion to three and one-half parts by volume of pigment suspension.

Example 2

Pigment suspension:
Talc _____ grams__ 33.0
Bentonite _____ do____ 2.0
Water _____ cc____ 39.3

Wax emulsion:
Paraffin wax _____ grams__ 6.0
Oleic acid _____ do____ 0.9
Triethanolamine _____ do____ 0.3
Water _____ cc____ 19.5

The wax emulsion is made by melting the wax to a fluid consistency with the oleic acid and then adding the triethanolamine and water with vigorous stirring. The wax emulsion thus formed is then dispersed in the pigment suspension with vigorous mixing until a homogeneous, smooth, paint-like consistency is obtained.

The mixed polyether sorbitan monopalmitate referred to above in Example 1 may consist of a mixture of 50% Span 40 and 50% Tween 40, these being the trade names of products manufactured by Atlas Powder Company. Span 40 consists of a mixture of three monopalmitates corresponding to the formulae:

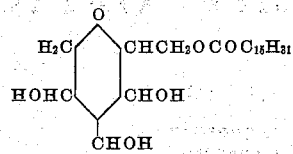

and

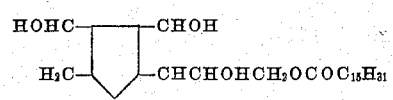

and

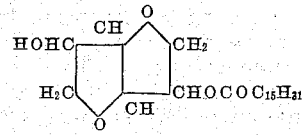

Tween 40 is a mixture of three monopalmitate polyoxyalkalenes corresponding to the formulae:

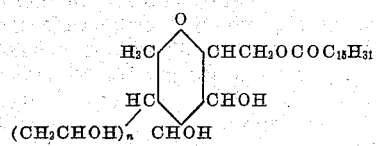

and

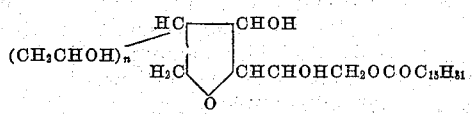

and

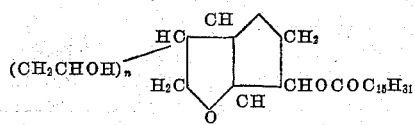

In actual use the above paint-like suspension is thinned with water to a proper brushing or spraying consistency and after application to the surface to be protected is allowed to dry and form a firm, white, light reflectant surface coating. This dry coating is substantially impervious to the action of water at temperatures below 80° F. but is readily removable by warm or hot water. Consequently, the coating is not removed by the cold water present in the spray booth during the spraying operation. When removal of the protective coating material and the accumulated residues is desired, the surface is flushed with a stream of warm or hot water which removes the entire protective coating, leaving the protected surface in substantially its original state.

In addition to the advantage of being substantially impervious to the action of cold water and removable with warm or hot water, the present invention provides a white, protective surface which reflects the light normally present in spray booth operations and thus aids in the proper illumination of the work being processed.

While the present invention has been described in detail it will be understood that various changes may be made by the substitution of equivalent materials or varying amounts of material to obtain the desired characteristics.

Having thus described my invention, I claim:

A protective light reflectant coating paste substantially impervious to the action of cold water but removable by the action of warm water, comprising substantially 27.4 grams whiting, 2.25 grams colloidal clay, 62.83 cubic centimeters water, 6.4 grams paraffin wax, and 1.12 grams emulsifying agent.

CHESTER W. SMITH.

REFERENCES CITED

The following references are of record in the file of this patent:

UNITED STATES PATENTS

| Number | Name | Date |
|---|---|---|
| 2,321,244 | Rawling | June 8, 1943 |
| 2,367,181 | Bernstein | Jan. 16, 1945 |
| 2,380,166 | Griffin | July 10, 1945 |